O. C. HOUGHTON.
COTTON HARVESTER.
APPLICATION FILED AUG. 7, 1909.
955,594.
Patented Apr. 19, 1910.
11 SHEETS—SHEET 1.
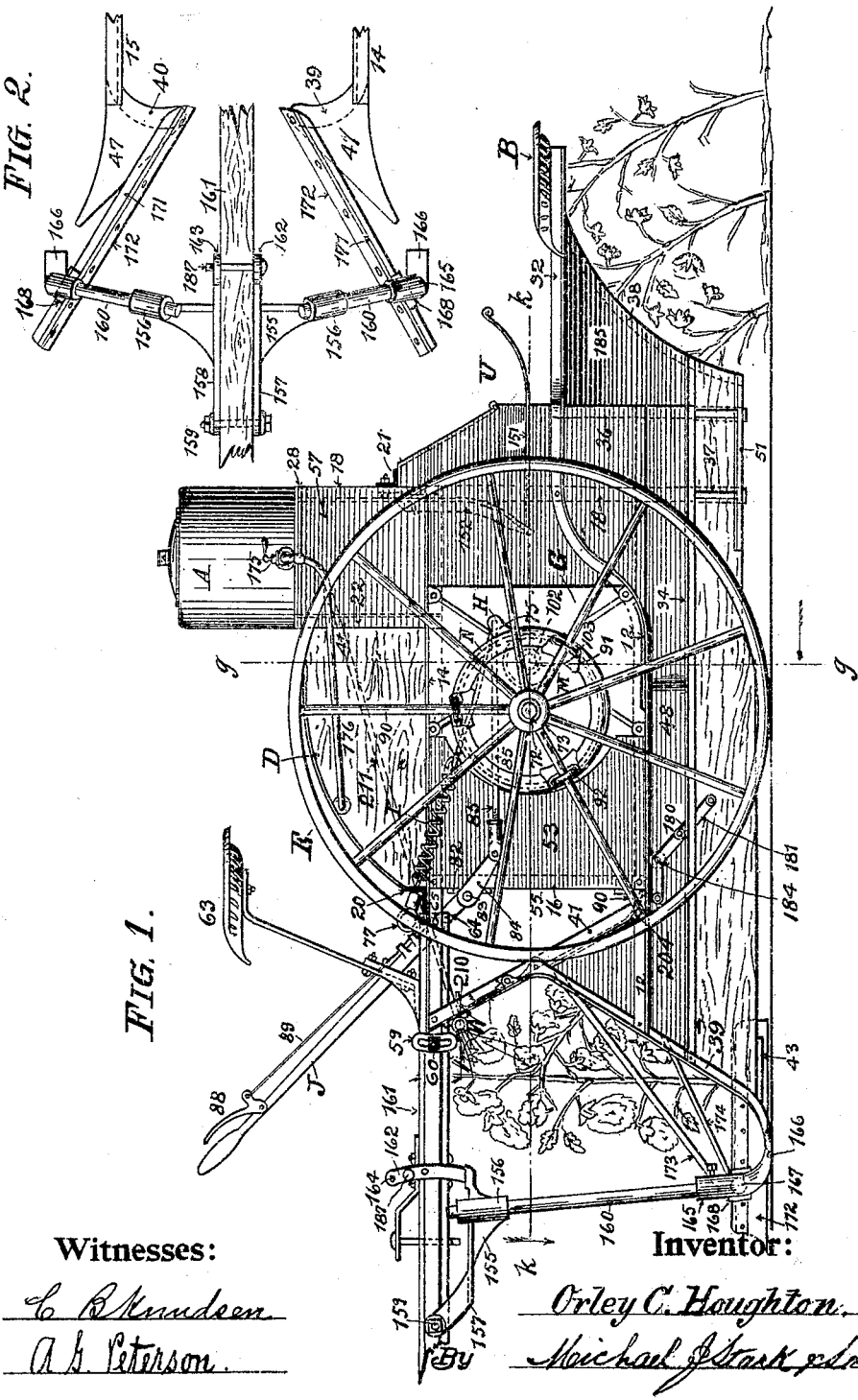
Witnesses:
C. B. Knudsen
A. B. Peterson
Inventor:
Orley C. Houghton
By Michael J. Stark & Sons
Attorneys.

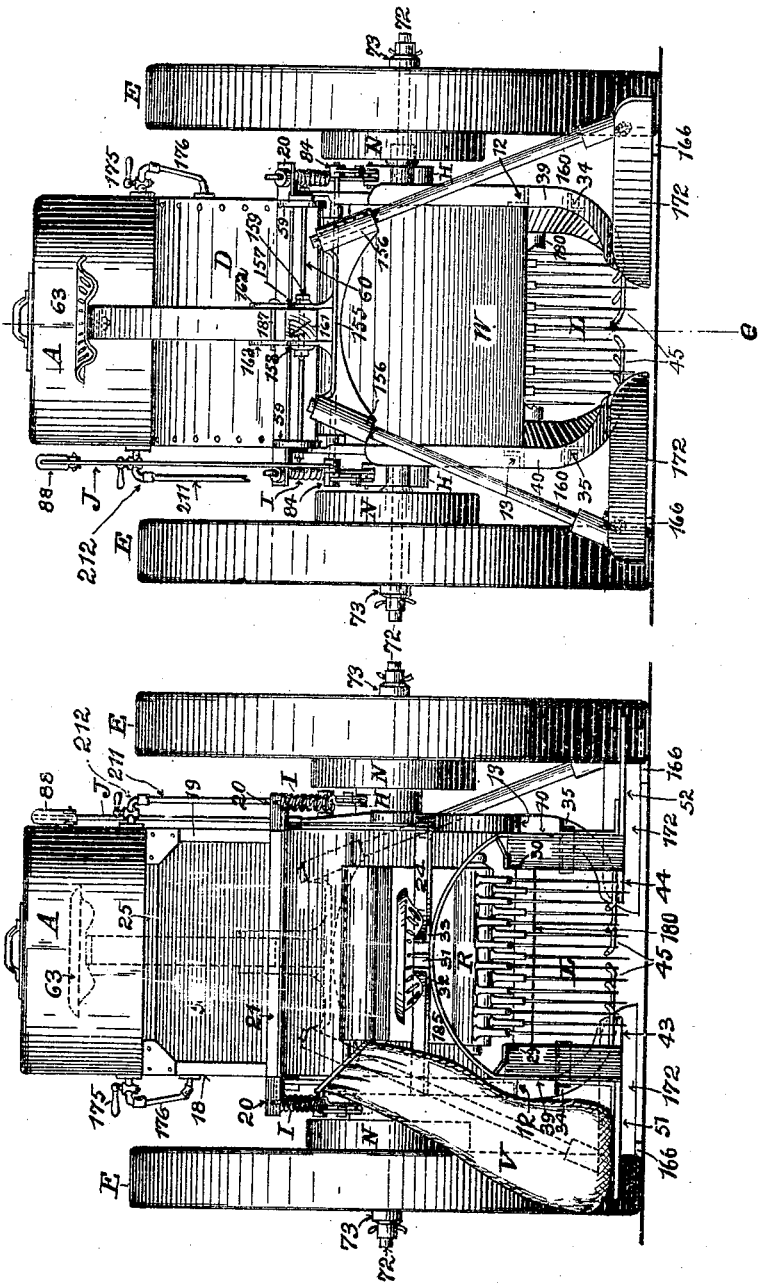

O. C. HOUGHTON.
COTTON HARVESTER.
APPLICATION FILED AUG. 7, 1909.
955,594.
Patented Apr. 19, 1910.
11 SHEETS—SHEET 3.
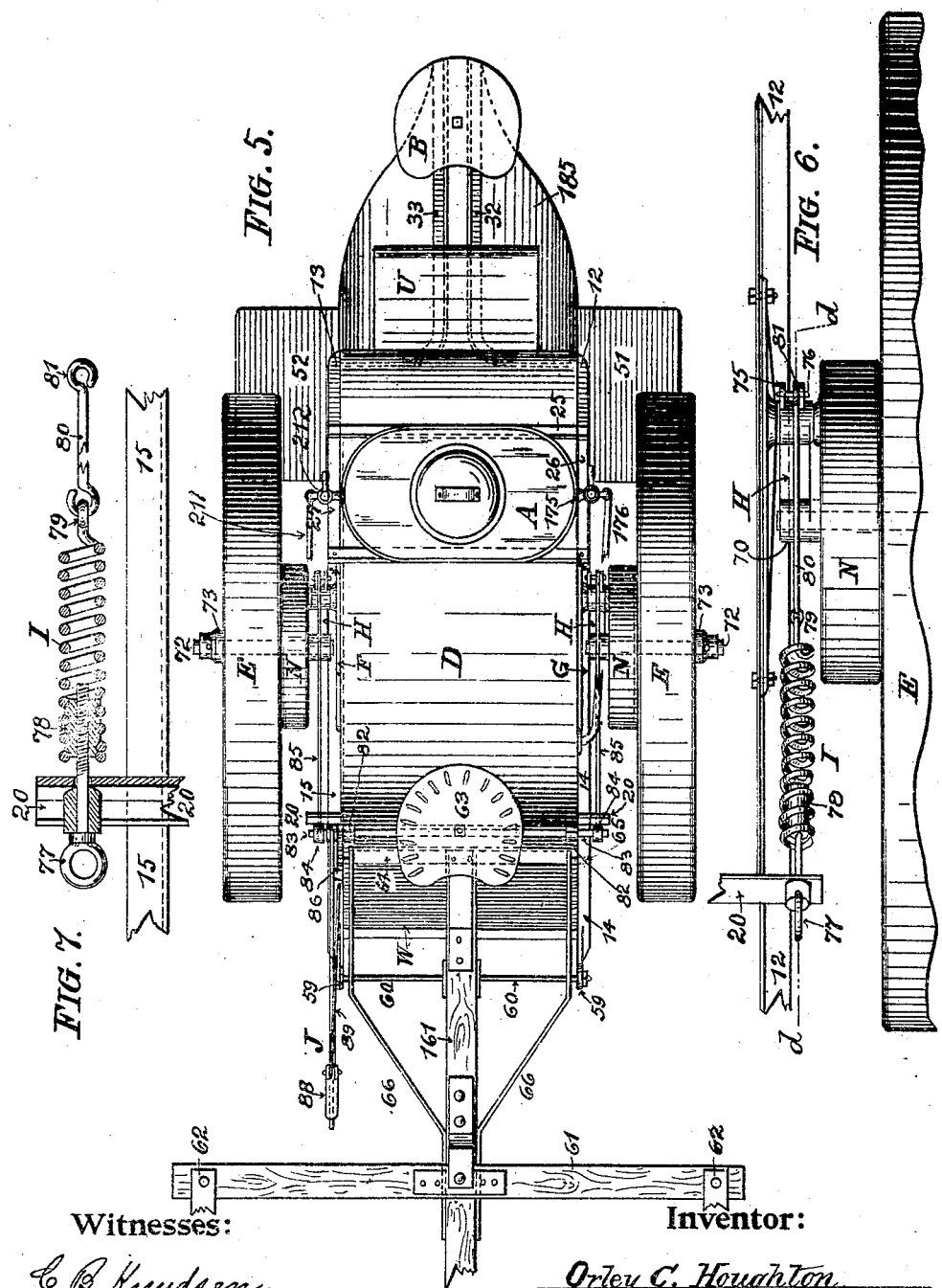
Witnesses:
C. P. Knudsen.
A. S. Peterson.
Inventor:
Orley C. Houghton
By Michael J. Stark & Sons
Attorneys.

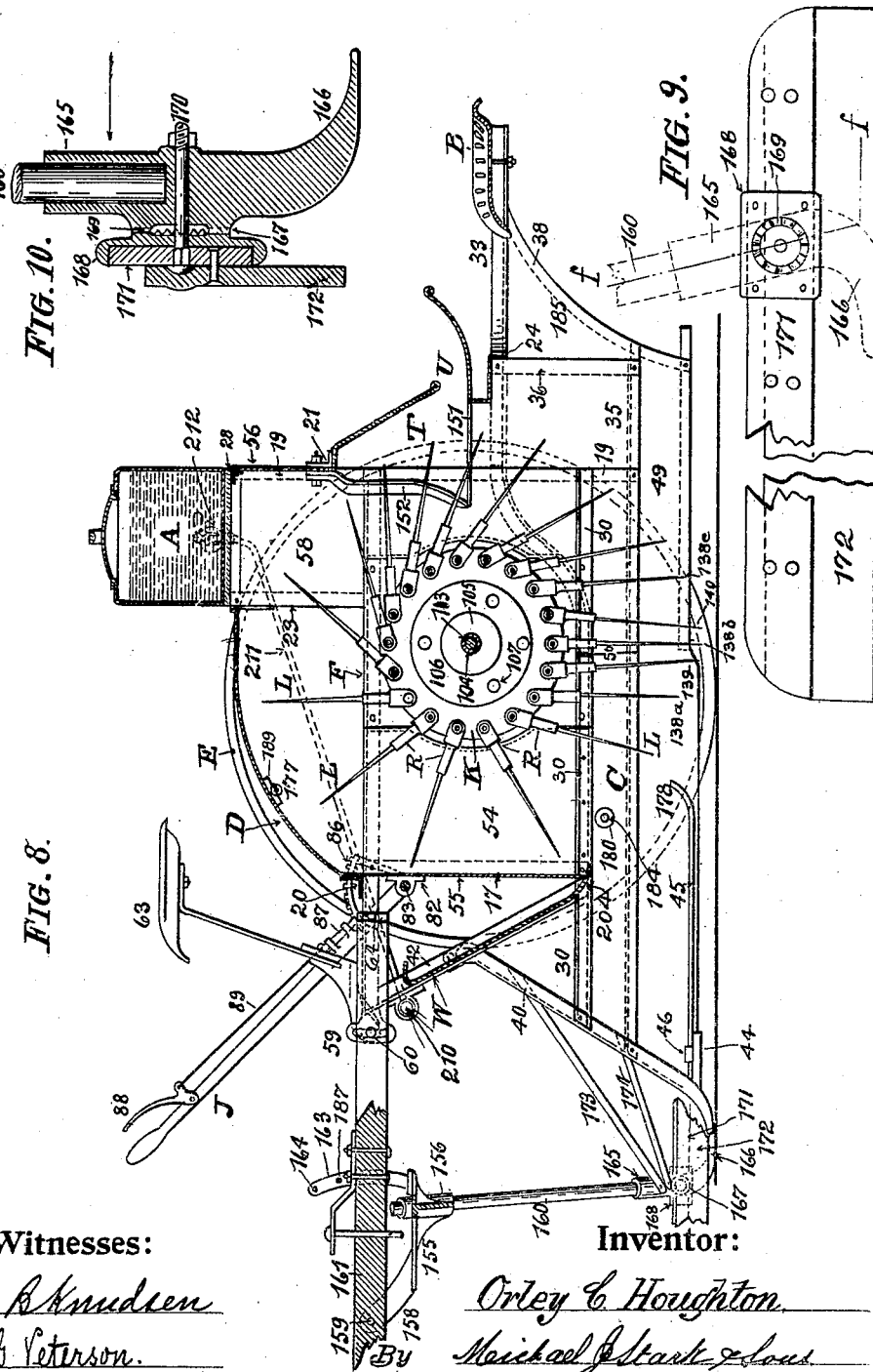

O. C. HOUGHTON.
COTTON HARVESTER.
APPLICATION FILED AUG. 7, 1909.
955,594.
Patented Apr. 19, 1910.
11 SHEETS—SHEET 5.
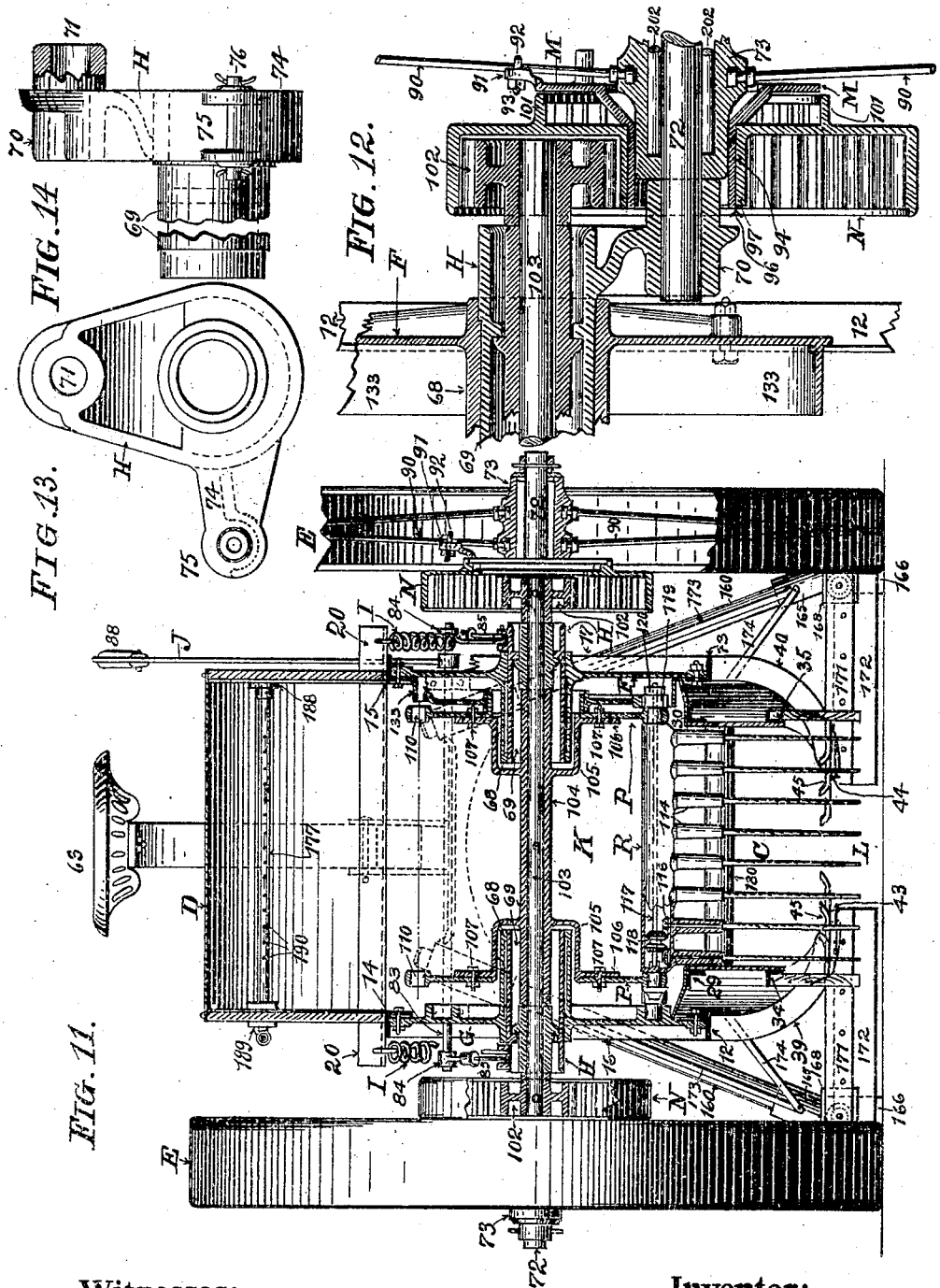
Witnesses:
C. B. Knudsen
A. G. Peterson
Inventor:
Orley C. Houghton,
By Michael J. Stark & Sons,
Attorneys.

O. C. HOUGHTON.
COTTON HARVESTER.
APPLICATION FILED AUG. 7, 1909.
955,594.
Patented Apr. 19, 1910.
11 SHEETS—SHEET 6.
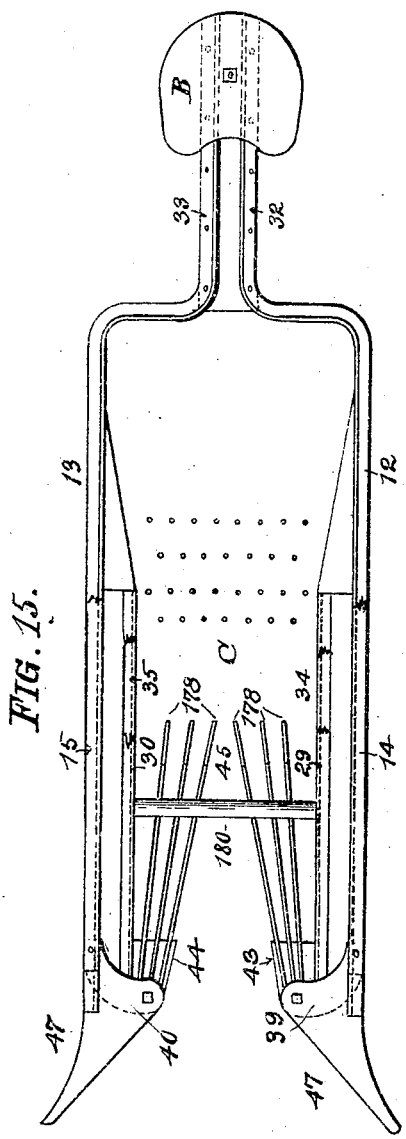
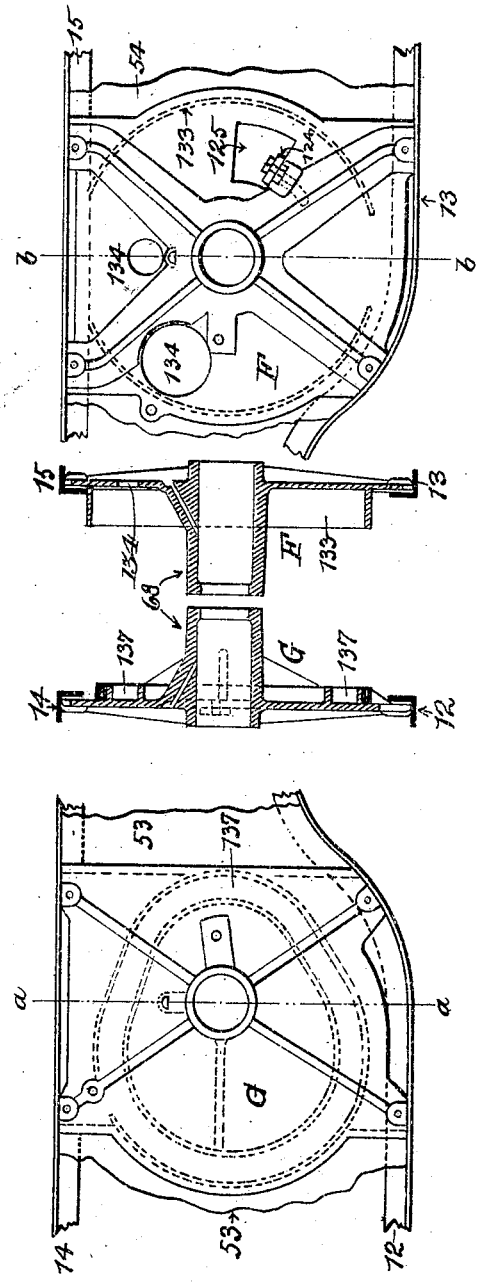
Witnesses:
E. B. Knudsen.
A. S. Peterson.
Inventor:
Orley C. Houghton,
By Michael J. Stark & Sons
Attorneys.

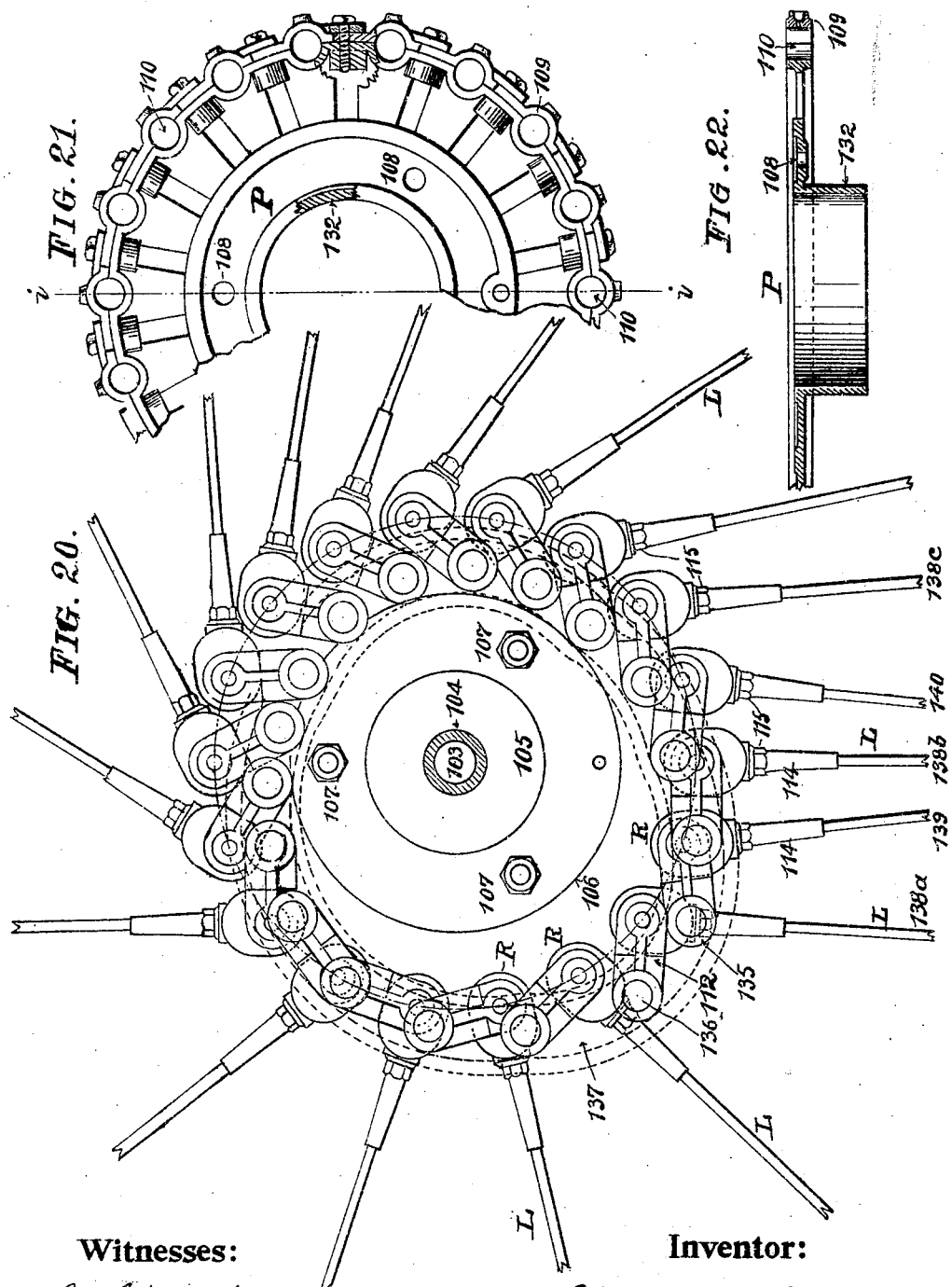

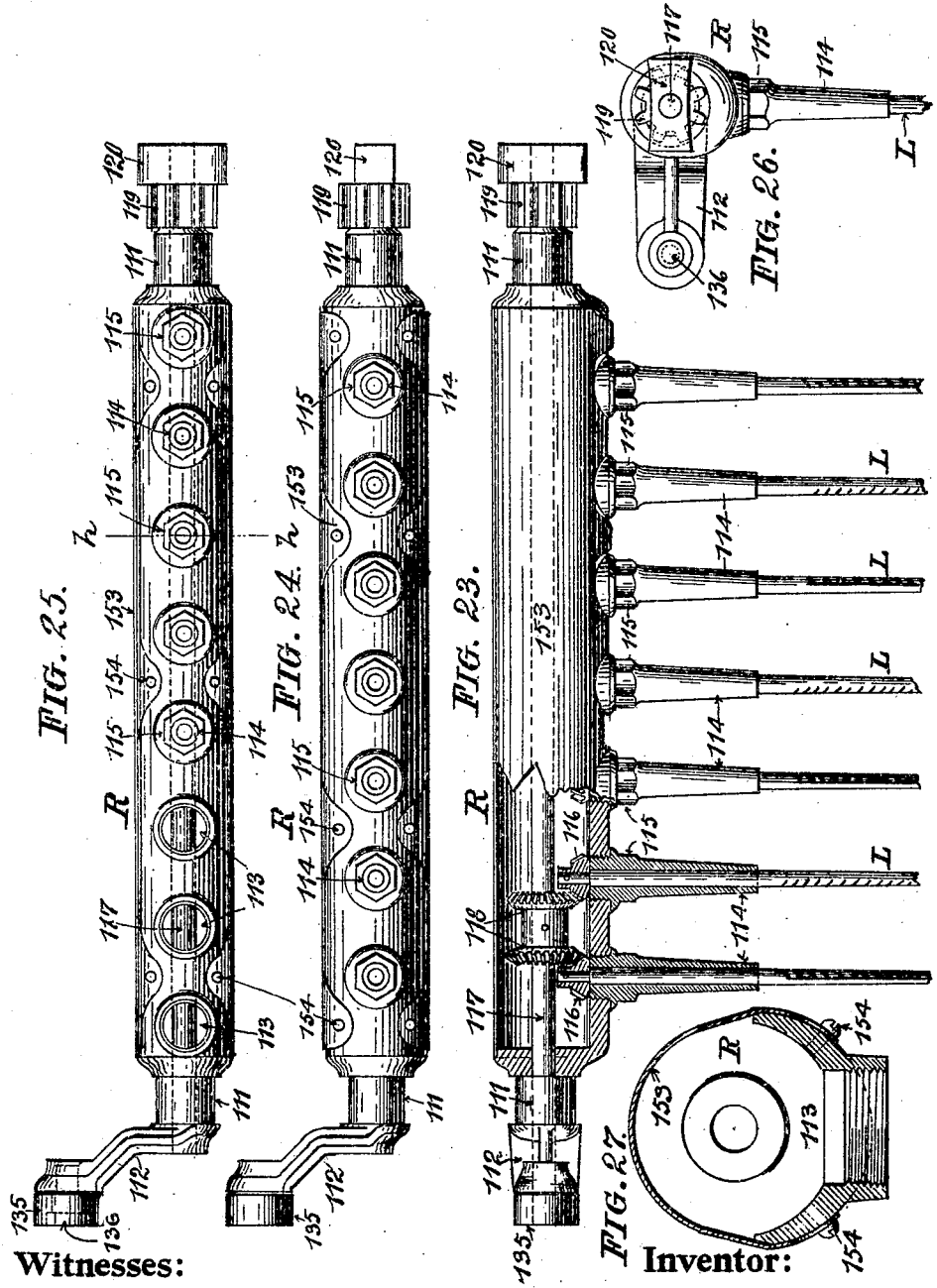

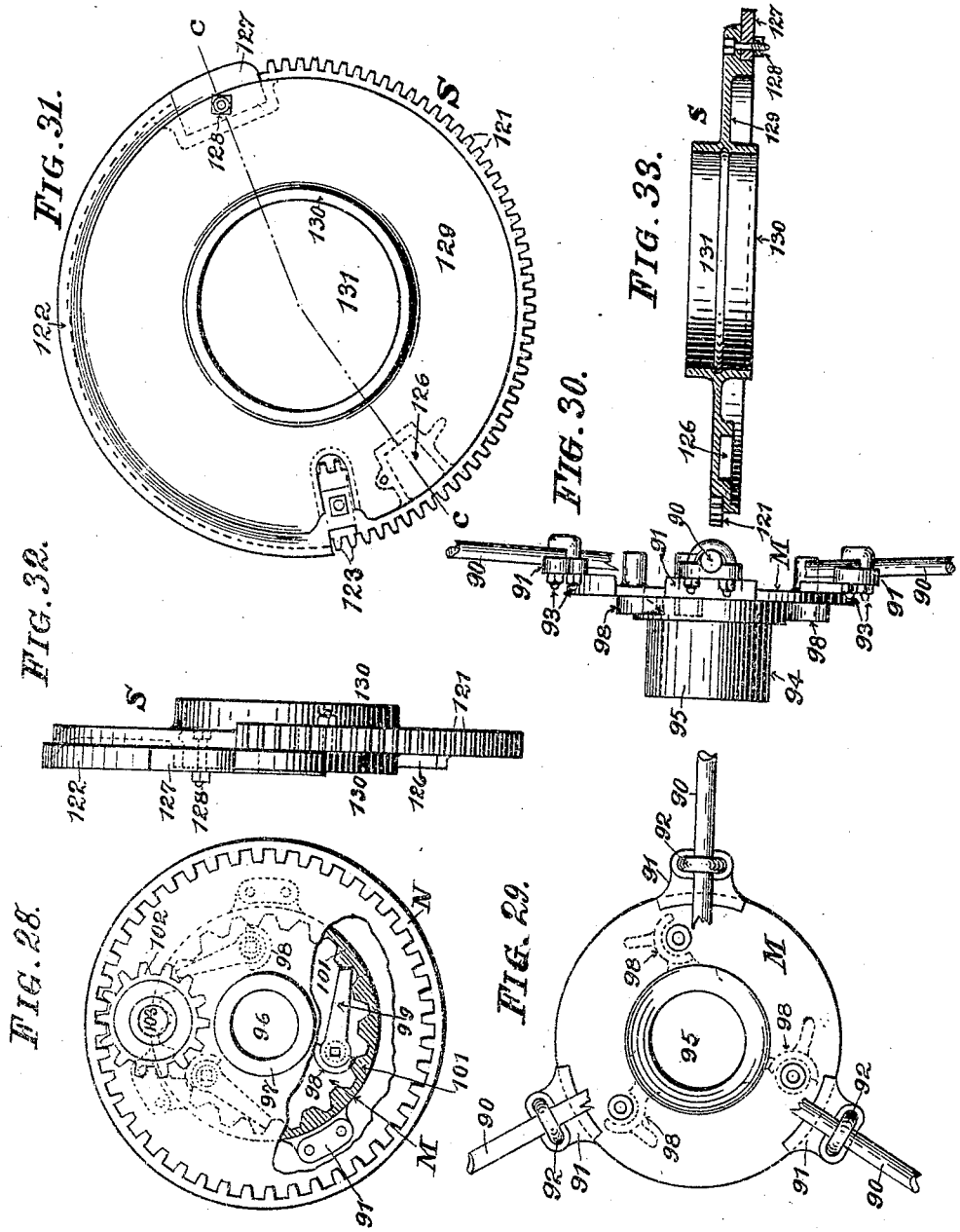

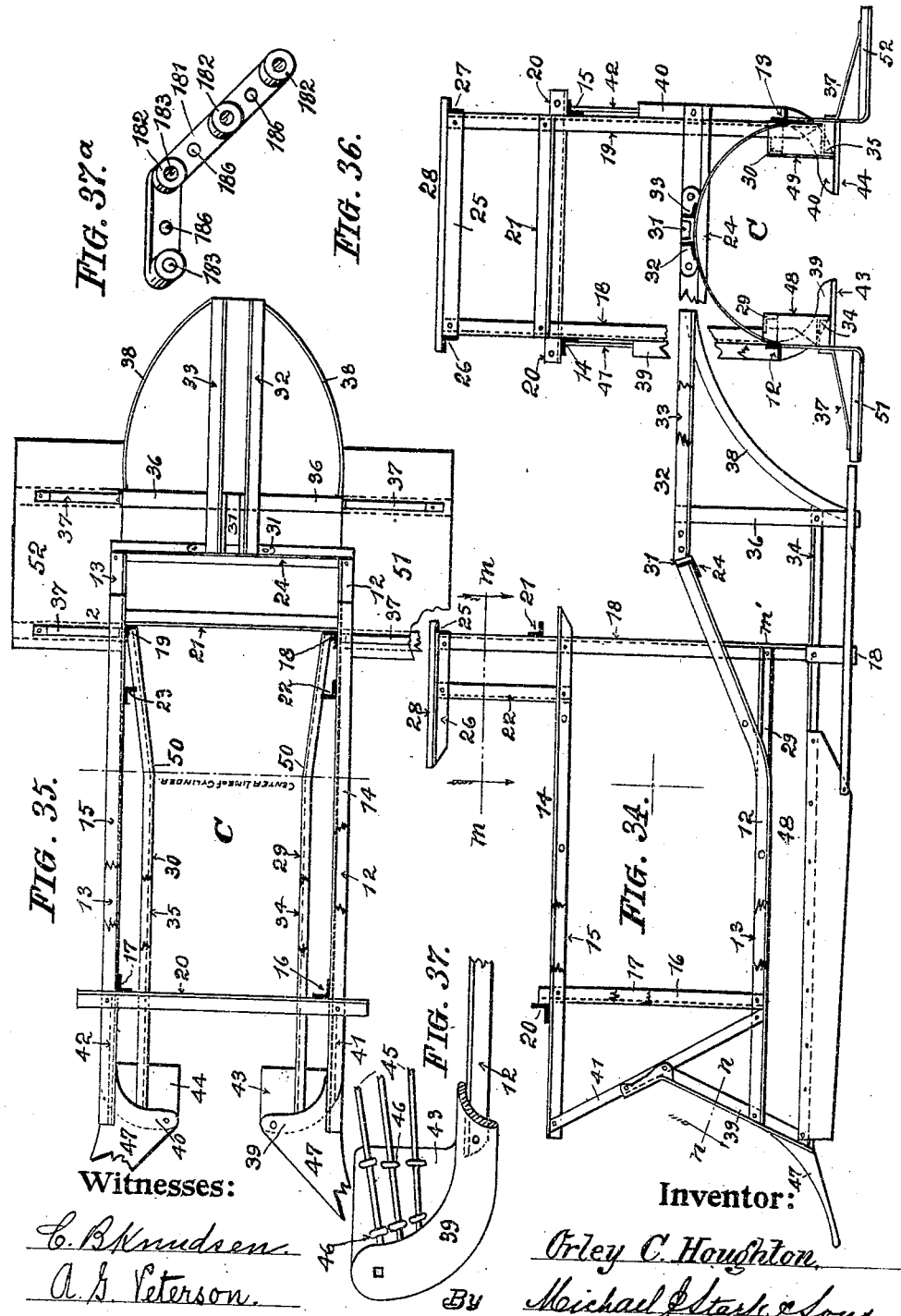

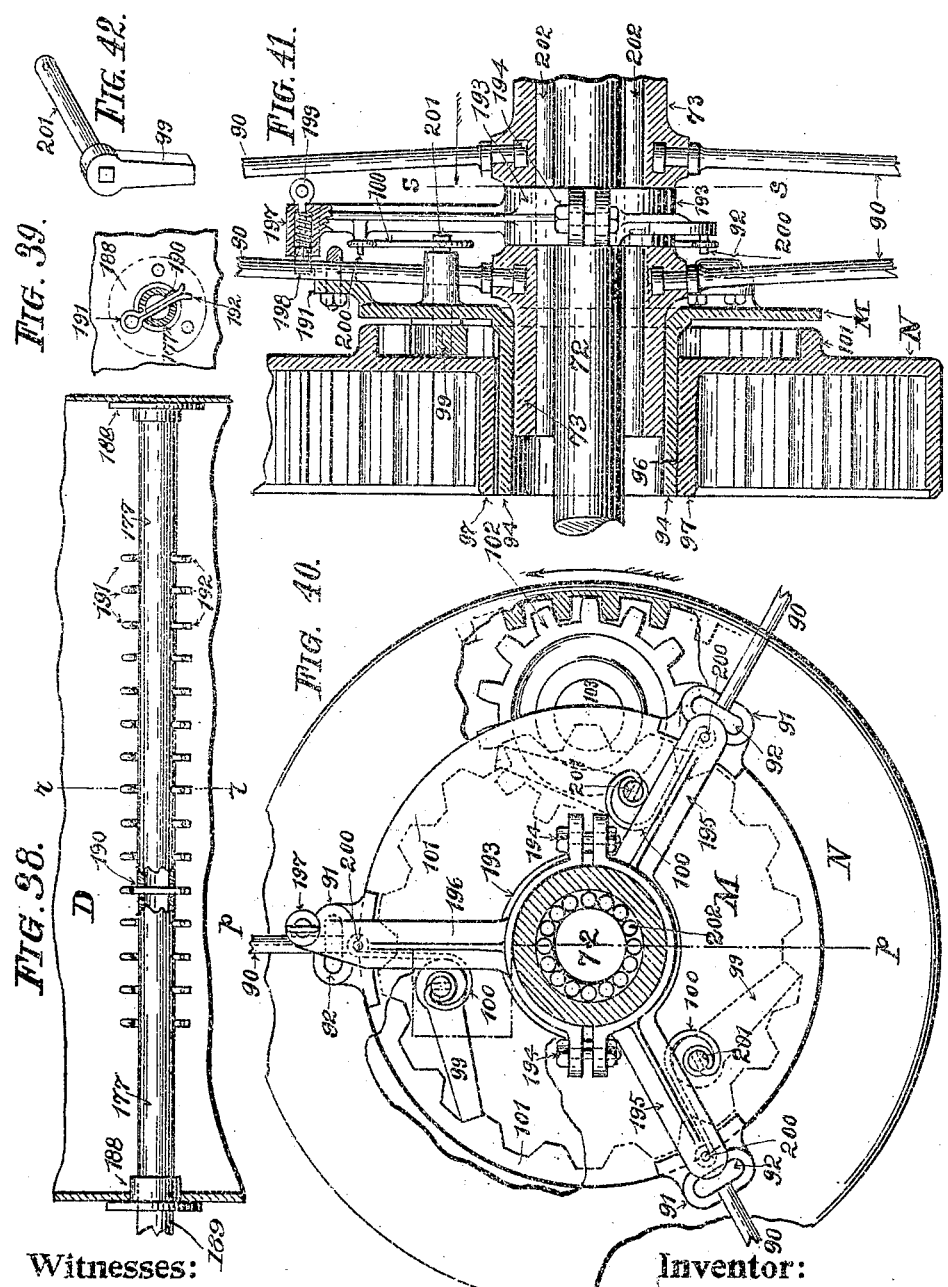

UNITED STATES PATENT OFFICE.

ORLEY C. HOUGHTON, OF CHICAGO, ILLINOIS, ASSIGNOR TO HENRY E. BULLOCK AND JAMES E. BULLOCK, BOTH OF CHICAGO, ILLINOIS.

COTTON-HARVESTER.

955,594.     Specification of Letters Patent.     Patented Apr. 19, 1910.

Application filed August 7, 1909. Serial No. 511,800.

*To all whom it may concern:*

Be it known that I, ORLEY C. HOUGHTON, a citizen of the United States, and a resident of Chicago, in the county of Cook and State of Illinois, have invented certain new and useful Improvements in Cotton-Harvesters; and I do hereby declare that the following description of my said invention, taken in connection with the accompanying sheets of drawings, forms a full, clear, and exact specification, which will enable others skilled in the art to which it appertains to make and use the same.

This invention has general reference to cotton harvesters, and especially to that class of machines in which a series of rotating picking fingers, moving in vertical planes parallel with the movement of the machine, are employed to pick cotton from the cotton plants. This type of cotton pickers, which actual and extended trials have demonstrated to be the most practical machines, is still capable of being improved to increase the gathering capacity thereof, while at the same time there is a demand for a less expensive machine embodying the valuable features of the rotating picking-spindles, but discarding some of the minor and less important details and appurtenants; and to produce such a machine which shall be highly efficient and serviceable, durable, and reasonable in cost, which is the object of this present invention, I construct the same as shown in the drawings already referred to, and in which—

Figure 1 is a side-elevation of this improved cotton harvester. Fig. 2 is a plan of a fragment of the forward end thereof and illustrating the adjustable gatherers. Fig. 3 is a rear-elevation, and Fig. 4 is a front-elevation of the machine. Fig. 5 is a plan thereof, the gathering means shown in Fig. 2 being omitted as also the springs by which the machine body is suspended. Fig. 6 is a plan of a portion of the machine drawn on a larger scale and illustrating a part of the mechanism by which the machine-body is elevated. Fig. 7 is a sectional plan of one of the springs employed to assist in the manipulation of the machine-body, the figure being drawn on line $d, d$, of Fig. 6. Fig. 8 is a longitudinal sectional elevation drawn on line $e\ e$ of Fig. 4. Fig. 9 is a rear-elevation of one of the gathering-scrapers detached. Fig. 10 is a sectional elevation of the same on line $f\ f$ of Fig. 9. Fig. 11 is a transverse-sectional elevation of the machine drawn on line $g\ g$ of Fig. 1, looking forward, a part of the clutch-disk M being omitted, and a portion of one of the traction-wheels being shown in section. Fig. 12 is a sectional plan of the driving-gear on line $k\ k$ of Fig. 1. Fig. 13 is a side-elevation of the bell-crank detached. Fig. 14 is an end-elevation of the same. Fig. 15 is a diagrammatic plan of the machine-body. Fig. 16 is a side-elevation of the cam-plate. Fig. 17 is a sectional elevation of the same on line $a\ a$ of Fig. 16. Fig. 18 is a side-elevation of the delay-gear plate. Fig. 19 is a sectional elevation of the same on line $b\ b$ of Fig. 18. Fig. 20 is an elevation of the cylinder with its series of columns and rotating picking-spindles, and illustrating the various positions occupied by the latter during one revolution of the cylinder. Fig. 21 is an elevation of a portion of one of the cylinder-heads detached. Fig. 22 is a transverse section on line $i\ i$ of Fig. 21. Fig. 23 is an elevation of one of the columns detached, a portion thereof being shown in section. Fig. 24 is a plan of the same illustrating a column having an uneven number of picking-spindles. Fig. 25 is a similar view of a column having an even number of picking-spindles. Fig. 26 is an end-elevation of one of the columns, and Fig. 27 is a transverse section of the same on line $h\ h$ of Fig. 25. Fig. 28 is an elevation of the driving-gear and the clutch-mechanism which prevents the driving-gear from operating when the machine is being backed up. Fig. 29 is an elevation of the clutch-plate and illustrating the method of attachment of said clutch-plate to the sprockets of the traction-wheels. Fig. 30 is an end view of the same. Fig. 31 is an elevation of the delay-gear detached. Fig. 32 is an end-elevation of the same, and Fig. 33 is a sectional view thereof drawn on line $c\ c$ of Fig. 31. Fig. 34 is a side-elevation of the skeleton or frame-work of the machine-body. Fig. 35 is a plan of the same, and Fig. 36 is an end-elevation thereof. Fig. 37 is a plan illustrating the means of attaching the guard-bars at the forward end of the machine. Fig. 37$^a$ is a perspective view of one of the bearings for the depression-roller. Fig. 38 is a sectional elevation of a portion of the hood or cover of the machine and showing the construction of the lubricator-tube. Fig. 11

39 is a transverse-section on line r r of Fig. 38. Fig. 40 is an elevation, partly in section, of the clutch-mechanism and the driving-means, looking in the direction of the arrow on Fig. 41, the figure being drawn on line s s of Fig. 41. Fig. 41 is a sectional elevation of the device illustrated in Fig. 40, the figure being drawn on line p p of Fig. 40. Fig. 42 is a perspective view of one of the dogs detached.

This cotton harvester comprises a machine-body within which the cotton-picking mechanism is located, said machine-body being mounted upon traction-wheels and moved over the cotton field by a team of horses hitched to a pole in the usual manner. This machine-body consists of a skeleton frame shown in detail in Figs. 34 to 37, and includes two outer lower, horizontal angle-bars 12, 13, and two upper, horizontal, angle-bars 14, 15, connected near their forward ends by vertical angle-bars 16, 17 and near their rear ends by further vertical angle-bars 18, 19. The upper angle-bars 14 and 15 are also connected by a transverse angle-bar 20, and the two vertical rear angle-bars 18 and 19 by a transverse angle-bar 21, and at their upper ends by a further angle-bar 25. A short distance forward of the rear vertical angle-bars 18 and 19, there are two vertical angle-bars 22, 23, which bars are connected with the upper ends of the rear angle-bars 18, 19 by longitudinal angle-bars 26, 27, the angle-bars 25, 26 and 27 supporting a base-board 28, upon which is located a water reservoir A. The two lower horizontal angle-bars 12, 13, are upwardly bent, as shown in Fig. 34 and they are connected together by a transverse angle-bar 24. To the latter angle-bar there is secured a yoke 31, to which in turn, there are fastened two rearwardly-projecting angle-bars 32, 33, spaced a suitable distance apart and carrying a seat, B, Figs. 1, 3, 5, 8, and 15 to be hereinafter referred to. Within this skeleton or frame there are two angle-bars 29, 30, which angle-bars are spaced closer together than the outer lower angle-bars 12, 13, but they are for a portion of their rear-ends outwardly bent, as shown in Fig. 15, to connect at their rear-ends with the vertical rear angle-bars 18, 19 at m', Fig. 34. Below these inner, horizontal angle-bars 29, 30, and running parallel therewith are two angle-bars 34, 35, which, however, project rearwardly beyond the angle-bars 18, 19, to which they are fastened, to connect with a curved bar 36, which curved bar 36 passes underneath the angle-bars 32, 33, and assists in supporting the latter bars. The ends of this curved bar are outwardly bent as shown at 50 in Fig. 35, to support platforms 51, 52, there being braces 37 serving as additional supports for said platforms 51, 52. To the rear of the arched bar there is a further arched bar 38 sustaining the rear ends of the angle-bars 32, 33, said rear arched-bar being connected to the arched bar 36, at the lower ends of the latter bar. In the front end of the machine-body the upper and lower horizontal angle-bars are connected by downwardly, and rearwardly projecting bars 41, 42, to which, in turn, are secured downwardly and forwardly projecting members 39, 40, serving as gatherers for the cotton bushes, said bars or members 39, 40, being inwardly turned at their lower ends as illustrated in Figs. 4 and 35, and provided with rearwardly projecting shelves 43, 44, upon which there are removably secured, rearwardly and inwardly projecting bars 45, by means of clamps or other suitable fastenings 46. Upon the faces and on the lower ends of the gathering members 39 and 40 there are secured outwardly pointing lifters, 47, which lift the lower branches of the cotton plants which are on and near the ground and properly guide the same into the machine-body.

The upper and lower inner angle-bars 29 and 34 and 30 and 35 are connected by, preferably sheet-metal, walls 48, 49, which form, as it were, the side-walls of a channel C, which receives the cotton plants while passing through the machine-body, and which channel widens at its rear end to permit the cotton plants to spread when the picking-spindles are withdrawn therefrom, as will hereinafter more fully appear.

The skeleton or frame of the machine thus far described is partly inclosed on both sides by walls formed preferably of sheet-metal: thus the vertical bars 16 and 18 are provided with the wall 53 which also connects with the upper and lower angle-bars 12 and 14 while the opposite side of the skeleton is inclosed by the wall 54, which is secured to the vertical angle-bars 17 and 19, and the horizontal angle-bars 13 and 15. The forward end of the skeleton is closed by a wall 55, Fig. 8 but the rear-end thereof is left open up to the transverse angle-bar 21, but closed between this angle-bar and the upper angle-bar 25, by a wall 56. The sides of the upper portion of the skeleton which supports the reservoir A are closed by side-walls 57, 58, while in front of this portion of the skeleton there is a removable cover D, which reaches to the transverse angle-bar 20 and thus closes the upper portion of the said frame-work or skeleton.

The upper horizontal angle-bars 14, 15, carry at their forward ends tilting-lugs 59, and between this forward portion of these two angle-bars 14, 15, there is secured upon a rod 60, Fig. 5, passing through the tilting-lugs 59, a pole 161, by means of which, and a team of horses attached to swingle-trees, not shown, pivoted to the double-tree 61 by straps 62 in the usual manner, the machine is propelled, and guided by an operator seated upon the seat 63, suitably supported upon the pole 161. The rear-end of the pole 161 has a cross-bar 64, provided with pivots 65, and braces 66, to give sufficient strength to the pole-connection with the machine-body.

The machine-body is indirectly mounted upon a pair of traction-wheels E in a peculiar manner, the mechanism of which includes a plate F, Figs. 18 and 19, which I shall hereinafter term the delay-gear plate, and a plate G, Figs. 16 and 17, which will hereinafter be designated the cam-plate, the former plate being secured to the upper and lower horizontal angle-bars 15 and 13, and the cam-plate G, to the upper and lower angle-bars 14 and 12 respectively. These two plates F and G have on their back inwardly projecting bosses, 68, within which are pivoted, bell-cranks, H, shown in detail in Figs. 13 and 14, which bell-cranks have long hubs 69, engaging the tubular bosses 68 on the plates F and G, so that the latter bosses serve as bearings for the long hubs 69. On the outer arm of these bell-cranks H, which are alike in construction except that one is "right" and the other "left", that is to say one belongs to the right-hand side of the machine and the other to the opposite side thereof, there is a boss 70, in the bore 71 of which there is permanently secured a stud or axle 72, upon which the traction-wheel E revolves with its hub 73. Inasmuch as the mechanism upon which the machine-body is mounted, and which includes the traction-wheels E, bell-cranks H and their appurtenants already described, are exact duplicates except that they are rights and lefts, I shall continue describing them in the singular number, unless there should be a difference in construction in some of these parts, in which case such difference will be specifically described. The second member 74, of the bell-crank H is formed into a double-eye 75, Fig. 14, through which a bolt 76, is passed.

The transverse angle-bar 20 upon the upper horizontal angle-bars 14, 15, near their forward ends, projects beyond these horizontal angle-bars and to this angle-bar 20 and on the projecting portion thereof, there are secured spiral springs I, in the following manner: An eye-bolt 77, Figs. 6 and 7, passes through bolt-holes in the vertical member of the transverse angle-bar 20, into a screw-threaded nut 78 which is permanently secured in one end of said spiral spring I, the opposite end of said spring I being formed into an eye 79, to which is attached a link 80 having on its free end an eye 81, engaging the bolt 76 in the double eye 75, of the bell-crank H.

On the forward wall 55, Fig. 8, there are secured two bearings 82 to receive a horizontally disposed shaft 83, upon which, and at its outer ends there are mounted arms 84, Figs. 1 and 11 which connect with the bolts 76 in the double eyes 75 by rods 85. Upon this shaft is, furthermore, mounted a hand-lever J, engaging a notched quadrant 86, best seen in Fig. 8, by a movable catch 87 operated by a rod 89 connected with a handle 88 pivoted to the outer end of the hand-lever J.

It will now be observed that the traction-wheels E, being mounted upon the shafts 72 secured to the bell-cranks H, and the latter pivoted in the side-plates F and G, the machine-body is pivotally-supported upon said traction-wheels and that this machine-body may be raised and lowered by operating the hand-lever J and through it and the arms 84 and rods 85 acting upon the bell-cranks H and rotating these bell-cranks, in a manner readily comprehended.

The cotton-picking mechanism includes a cylinder K, and a series of rotating picking spindles L, which mechanism is operated in the following manner: To several of the spokes 90, of the traction-wheels E there is secured a clutch-plate M, by lugs 91, formed thereon, and clamping bolts 92, embracing said spokes and passing through said lugs 91, nuts 93 being provided to securely hold the plate M to said spokes, said clutch-mechanism being clearly illustrated in Figs. 28, 29 and 30. On the back of this plate M there is a hub 94, the bore 95 of which fits upon the inner end of the hub 73 of the traction-wheel E, while its outer surface is machined to engage the bore 96 of a hub 97, projecting from the inner surface of an internally-toothed gear-wheel N, which gear-wheel N revolves loosely upon said hub 94. On the back of the clutch-plate M there are formed a series of approximately semi-circular pockets 98, wherein are located dogs 99, having springs 100, to normally engage said dogs with an internally toothed rim 101, Figs. 12, 28 and 40, formed on the back of the internal gear-wheel N. These dogs 99 are so disposed that when the machine is being moved in a forward direction they engage the teeth in the rim 101 and thus revolve the internal gear N in a corresponding direction, but when the machine is backed up, the dogs 99 will slip over the teeth in the rim 101 and thus prevent the rotation of the internal gear N. The internal gear-wheels N rotate two gear-pinions 102, which are securely keyed or otherwise fastened upon a transverse shaft 103, at its outer ends, which shaft rotates the cylinder K by means comprising a tubular sleeve 104, Fig. 11, having on both ends bell-shaped enlargements 105, terminating in outwardly-projecting flanges 106, these bell-shaped enlargements being designed to admit the inwardly projecting tubular bosses 68 of the plates F and G. To the flanges 106 are bolted cylinder-heads P, illustrated in detail in Figs. 21 and 22, by means of bolts 107, passing through said flanges 106 and bolt-holes 108 in the cylinder-heads P. The outer peripheries of these cylinder-heads P are notched with semi-circular notches, there being an even number of such notches, and upon the peripheries are secured caps 109, formed with semi-circular grooves, the notches and grooves combined forming bearings 110, for the trunnions 111 of a series of columns R, shown in detail in Figs. 23 to 27 inclusive. The sleeve 104 is securely fastened upon the cylinder-shaft 103 so that the cylinder K may revolve therewith, roller-bearings, not shown, being provided to reduce friction as much as possible.

I have already mentioned the delay-gear plate F and the cam-plate G and I shall now proceed to describe their specific details of construction in connection with the columns R carrying the picking spindles L. These columns are cast-metal bodies having on both ends the trunnions 111 and on one end curved arms 112. The body of these columns is approximately semi-circular in transverse section and this portion thereof is bored and tapped to afford a series of openings 113, one-half of the entire series of these columns being provided with an even number of these openings 113, as illustrated in Fig. 25, and the other, intermediate, columns with an odd number of these openings, the openings in one set of columns being intermediate of the other set of columns. This arrangement of the columns permits of a greater space between the openings while the picking-spindles in these columns are, nevertheless, closer together when operating in the cotton bushes, it being desirable to concentrate the picking-spindles in the smallest possible space consistent with the proper functioning thereof in picking cotton. Into the openings 113 are screwed nozzle-shaped bearings 114, which bearings are tubular bodies having screw-threaded engagement with said openings 113, and provided with polygonal wrench-sections 115, to enable their being securely but removably fastened to the columns, so that when these bearings are worn they may be readily renewed. In these bearings are located the upper ends of the picking-spindles L, there being bevel-pinions 116, pinned or otherwise fastened to the upper ends of said picking-spindles, which pinions may be small enough in diameter to pass through the openings 113 in the columns, so that when a bearing 114 has to be removed from the column owing to wear, or a spindle L has to be removed on account of wear, or has become bent which occasionally happens, the entire spindle with its pinion can be removed by unscrewing its respective bearing 114. This construction is an important feature in the present construction of the cotton harvester since by its introduction the time consumed in making repairs is reduced to a minimum.

In the column R there is a longitudinal shaft 117 upon which are mounted pairs of bevel-wheels 118 each of which engages a pinion 116, as shown in Fig. 23. They are made in pairs to reduce cost of manufacture and to minimize the handling of parts, and they face in opposite directions to cause the picking-spindles to alternately revolve in opposite directions, whereby better results in the quantity of cotton picked from the bushes are attained. The shafts 117 of the columns R are revolved intermittently, by means of gear-pinions 119, fastened to the outer end of said shafts, said pinions being formed, preferably integral, with slides 120, and they are rotated, when rotating with the cylinder K, by engagement with a mutilated gear-wheel S, illustrated in detail in Figs. 31, 32, and 33, and consisting of a disk having on approximately one-half of its periphery gear-teeth 121, wherewith the pinions 119 engage, the other half of said disk having a smooth periphery 122, the latter portion being offset from the gear-toothed portion so that when the gear-pinions reach this offset portion they are released from engagement with the toothed portion, the slides 120 then engaging the smooth periphery 122 and preventing the pinions from rotating. This delay-gear remains stationary, but to prevent breakage of the initial teeth 123, which receive the impact of the gear-pinions 119 when reaching the toothed section 121, this delay-gear is practically stationary but slightly yielding by coming in contact with a bar 124, Fig. 18, on the delay-gear plate F which bar 124 is fastened in, and passes through an opening 125, in the delay-gear plate F and enters a pocket 126 in the delay-gear S. This bar 124 is sufficiently elastic to yield slightly every time that a pinion 119 reaches the initial teeth 123 in the toothed portion 121 and thereby in part, absorb the shock caused by the impact of the gear-teeth. When the pinions 119 with their slides 120 reach the smooth section 122 of the delay-gear S, there is caused considerable wear of the initial portion of this smooth section and in order to avoid wear at this initial, or entrance-end, of the smooth section, I form a notch therein and locate in this notch a block or portion 127, which is held in position by a bolt 128, said section 127 being preferably cast in hard iron or made from hardened steel and thus wears very much longer than the cast-iron of which the body of the delay-gear is made. The web 129, has on both sides projecting bosses 130, the bore 131 of which engages the outer periphery of a tubular boss 132, on the cylinder-head P adjacent to the delay-gear, thereby forming a bearing for said delay-gear and means for properly centering the delay-gear with relation to the cylinder-shaft 103.

To prevent cotton that may be floating in the interior chamber of the machine-body from reaching the delay-gear or the gear-pinions meshing therewith, there is formed on the inner surface of the delay-gear plate F, a rim 133 Figs. 11, and 19, which protects these gears, and in order that the revolving parts of this mechanism may be reached for lubrication there are formed suitable openings 134, in addition to the opening 125 already mentioned, through which lubricating oil may be introduced in an obvious manner.

As heretofore stated, the columns R have on one end the arms 112. These arms carry on their ends rollers 135, upon pivotal bolts 136 said rollers engaging a peculiarly shaped cam-groove 137, Figs. 11, 16, 17, and 20, whereby the picking-spindles L are caused to assume the various positions shown in Fig. 20, that is to say that while the picking-spindles in three of the columns, designated by the reference numeral 138$^a$, 138$^b$, and 138$^c$ respectively assume an approximately vertical position, the series of picking-spindles designated by the numeral 139 incline rearwardly, and those marked 140 incline forwardly so as to cause the free or lower ends of these picking-spindles 138$^b$, 139 and 140 to approach each other, as illustrated in Figs. 8 and 20, to concentrate the picking-means within a comparatively small space and thereby to secure a more perfect picking of cotton from the plants in which these picking fingers operate.

As the cylinder K revolves and the picking-spindles move upwardly they pass through a grate or stripper comprising a series of approximately horizontal bars 151, and a series of approximately vertical bars 152, where the cotton lint adhering to the picking spindles is stripped therefrom to gather in a receptacle U, and from which the cotton lint is manually removed by an operator seated upon the rear-seat B who drops this cotton lint into a bag V, Fig. 3, suitably suspended from the machine and resting upon the platform 51. Two bags may be used, one on each side of the machine, if desired.

As heretofore stated the columns R are approximately semi-circular cast-metal bodies, but in order that the gear-wheels therein be properly protected from floating cotton lint, there is located over said gear-wheels a, preferably, sheet-metal, cover 153, which cover is removably secured to the cast-metal portion of the column, by screws or other suitable fastenings 154, as clearly illustrated in Figs. 24, 25, and 27.

In the cotton field, and after some of the bolls have opened, there is always more or less cotton lint spread over the ground adjacent to the cotton plants, and in order to push this loose cotton into the path of the picking-mechanism, I locate in front of the machine a self-adjusting scraper mechanism comprising a yoke 155, having on each end a socket 156. This yoke is pivoted to the pole 161 by two, forwardly extending arms 157, 158, by a bolt 159. On this yoke there are also two upwardly-projecting members 162, 163 preferably formed integral with said yoke 155, and fitted with a series of bolt-holes 164 within which is located a bolt 187, which bolt, when placed into one of the series of holes 164 and permitted to bear upon the upper surface of the pole 161, will prevent the yoke 155 from dropping beyond the distance limited by said bolt, but does not prevent the yoke from moving freely upwardly a predetermined distance. The sockets 156 are outwardly and rearwardly turned, and they are arranged to receive the upper ends of rods 160, the lower ends of said rods engaging sockets 165, said sockets 165 being formed with rearwardly turned shoes 166, which shoes normally rest upon, and follow the undulations of the ground over which the machine is being moved. On the face of this socket 165 there is a circular projection 167 provided with radial serrations, wherewith engages a plate 168, having radial serrations 169, Fig. 9, a bolt 170, Fig. 10, retaining the plate 168 in any position in which it can be placed by reason of the interlocking serrations. The plate 168 is affixed to a bar 171, to which, in turn, a flexible member 172, is fastened, which flexible member is, preferably, made from stout rubber belting that resists moisture, and which member 172 constitutes one of the rearwardly turned scrapers, there being two of these scrapers, as clearly illustrated in Figs. 2 and 4, and several other figures of the drawings.

It will now be observed that by reason of the yoke 155 with its attached parts constituting the scrapers, being pivoted and free to rise and fall within certain limits, the scrapers are free to follow the undulations of the ground, owing to the shoes 166 which have broad ground-bearing surfaces and are thereby enabled to lift the scrapers, when necessary, while they may fall by their own weight. It will also be observed that by the introduction of the serrated members on the scraper-plates and on the lower sockets 165, the scraper-plates 172 may be set at the proper angle to correspond with the usually inclined surface of the ground adjacent to the cotton plants. To properly sustain the lower ends of the rods 160, there are brace-rods 173, 174, Figs. 1, 8 and 11, connecting these rods with the inclined gathering-bars 39, 40, respectively.

I have discovered while operating this cotton picker in the field that when the atmosphere is hot and dry, the cotton bolls are large and the cotton lint fluffy, and that it will scatter or spread out easily, while when the air is humid the cotton bolls contract and adhere to the hulls. I have, therefore, provided this cotton harvester with means for moistening the cotton bolls before the cotton bushes enter the machine, as well as during the time that the picking-spindles are operating therein, said means comprising a reservoir A, which may contain water, or coal-oil, or other suitable lubricant, and furnish the same with a faucet 175, from which a hose 176, Figs. 1, and 5, leads into the forward part of the machine, where a perforated pipe 177 or other effective means, distributes the lubricant properly within the body of the machine. I also locate a second, perforated, pipe 210, Figs. 1 and 8, transversely in front of the apron W, which pipe is identical in construction with that of the pipe 177 to be hereinafter more particularly described, and from which pipe the water is sprayed upon the cotton plants before they enter the channel C in the machine-body, and thereby accomplish the desired result in an effective and highly efficient manner. This second pipe 210 connects, by a hose 211, with a faucet 212, preferably located on the tank A opposite the faucet 175 which supplies the tube 177 within the hood D. The details of construction of this lubricating device are more clearly illustrated in Figs. 38, and 39, and comprise the tube 177 which has suitable supporting-members 188, to retain said tube in the hood D, and means 189, at its outer end, to receive the hose 176. This tube has a series of holes 190, through which are passed cotter-pins 191, the ends of which are outwardly-bent at 192. These cotter-pins are inclined so that one of the bent members is in a substantially vertical position. In this manner, the lubricant dropping from the vertical members of the cotter-pins, falls into the plane of movement of the picking-spindles as the cylinder revolves and thus lubricates the picking-spindles. There are as many of these holes 190, with their cotter-pins 191 as there are spindles in two of the series of columns, there being eight spindles in one column and seven spindles in the next succeeding column and, therefore, fifteen of the lubricating members in said tube 177. In the tube 210, the cotter-pins 191 may be omitted and the tube drilled with a sufficient number of small orifices or holes so as to produce the spraying effect desired.

In cotton harvesting machines having a channel within which the cotton plants are received to pick the cotton therefrom, it is desirable that the cotton bushes be confined within as small a space as is consistent with the proper functioning of the picking-mechanism, and in order to accomplish this object the guard-bars 45 have their rear-ends upwardly curved at 178, Fig. 8, and above this curved portion 178, I have located in the forward part of the machine-body, a depressor, consisting of a roller 180, which is journaled in bearings 181, Fig. 1, which bearings are located on both sides of the machine, and one of which is shown in detail in Fig. 37$^a$. These bearings are made right and left, the one belonging to the left side, looking forward of the machine, being illustrated in said Fig. 37$^a$. It is a flat bar bent near one end at an angle of approximately 135 degrees and having a series of bosses 182, perforated at 183, to receive the journals 184, Fig. 1, of said roller 180. By placing this roller in one or the other corresponding pair of said bearings 183, its location may be changed so as to bring it nearer to the guard-bars 45, and also closer to the picking-spindles, if desired. These bearings are secured to the side-walls 48 and 49 by suitable bolts passing through bolt-holes 186, shown in Fig. 37$^a$.

In Figs. 1, 5, 8, and 15, I have shown the lower longitudinal angle-bars 12 and 13, as being upwardly and rearwardly bent so as to elevate the seat B sufficiently from the ground. While this construction is probably more pleasing to the eye, I may, however, adopt permanently the construction illustrated in Figs. 34 and 35, where the two lower longitudinal angle-bars are upwardly bent and where, at their rear-ends, they are connected with the transverse angle-bar 24, to which, in turn, the two rear angle-bars 32 and 33 are secured by the yoke 31.

In order to protect the lower limbs of the person seated upon the rear-seat B from the branches of the cotton plants when passing out of the machine, there is placed over the curved bars 36 and 38 a sheet-metal, curved, guard 185, Figs. 1, 3, 5, and 8.

I have heretofore mentioned the clutch-mechanism by means of which the picking-mechanism is rotated when the machine is forwardly moved, and stopped when backed up or turned about. In order to stop all the moving parts of the picking-mechanism whenever desired, as for instance, when going into the field or returning therefrom, I provide the mechanism shown in detail in Figs. 40, 41, and 42, which mechanism comprises a split band 193, formed of two members secured together by bolts 194, said band being located upon the middle portion of the hub 73 between adjacent spokes, and being made in two parts to enable its being placed in position upon said hub. This band 193 has three arms, two of which, 195, are formed, preferably integral, with one of the halves of said band and the third arm, 196, with the other member of said band. On this latter arm 196, there is formed a socket 197, at its outer end, within which socket is located a spring-retained bolt 198, projecting with one end from said socket 197, and having a convenient handle 199. Upon each of these three arms there are projecting pins 200, wherewith engage the ends of the springs 100. These springs are spirally wound around the shanks 201, Fig. 42, of the dogs 99, as illustrated in Fig. 40, and they are so tensioned that when the parts are in their normal positions shown in Figs. 40 and 41, the dogs 99 are in engagement with the internally-serrated rim 101. To disengage these dogs so that the picking-mechanism will not revolve when the machine is moving forward and backward, the bolt 198, is pulled and the arm 196, moved forwardly in the direction of revolution of the traction-wheel E, and then the bolt 198, permitted to resume its normal position on the opposite side of the spoke 90. Thus the three arms 195, and 196, have moved sufficiently to lift the dogs out of the path of the serrations in the rim 101, by the action of the springs 100 rotating said dogs in an obvious manner. To reduce friction, I have located in the hubs of the traction-wheels friction-rollers 202, as shown in Figs. 12, 40, and 41. I have also hereinbefore stated that one-half of all the columns in the cylinder have an even, and the other half an odd number of picking-spindles, the columns with the even number of spindles, alternating with those having the odd number. This construction, while very effective and efficient, is, nevertheless, capable of being modified by all the columns having either an even or an odd number of picking-spindles, the essential feature being that the spindles in one column be placed intermediate of the spindles in the adjacent columns. Nor is it absolutely necessary that there are an even number of columns in the cylinder, although an even number thereof is preferred, the only disadvantage arising from an uneven number of columns being, that the picking-spindles in two adjacent columns of the series of columns move in the same vertical plane.

It will be noticed that the axles of the traction-wheels are indirectly connected with the machine-body by the bell-cranks H which, as it were, form intermediaries between said traction-wheels and said machine-body, and that this machine-body may be elevated and lowered, to follow the undulations of the ground over which the machine is being moved, or to pass over obstructions in the field, and be also elevated to pass to and from the field, by oscillating or rocking these bell-cranks by means of the hand-lever J and the shaft 83 with the arms 84 and the rods 85, which rods connect said arms 84 with the bell-cranks H.

By reference to Fig. 1, it will be observed that when the machine is moved over a row of cotton plants to pick cotton from the same, these plants are forwardly deflected by an apron W, which is secured to the two downwardly and rearwardly inclined angle-bars 41, 42, and turns at its lower end 204, into the channel C. In their passage through said channel, the guard-members 45, lift the lower branches of the cotton bushes, and their rear ends 178, being upwardly turned act, in conjunction with the compression-roller 180, to compress the bushes into the smallest allowable bulk and at the same time hold the branches of the bushes forwardly, while those picking-spindles L, which are lowermost in said bushes withdraw the cotton-lint therefrom. After the bushes have passed the vertical center line of the cylinder, they are permitted to spread owing to the widening of the channel C at its rear-portion, to enable the picking-spindles to withdraw therefrom with but a small chance of the lint, adhering to the picking-spindles being stripped therefrom by coming in contact with branches of the cotton bushes. It will thus be seen that the guard-members coöperate with the depressor to produce the result just described, of depressing and holding the plant-portions depressed within a comparatively small space while the cotton is being picked therefrom.

In the operation of this machine, when the clutch-mechanism is engaged to rotate the cylinder, this cylinder rotates continuously with its columns and picking-spindles but the latter do not rotate continuously around their axes of rotation during the time that the cylinder performs one revolution, so that after the picking-spindles enter the channel in the machine-body, they will begin to rotate and continue to rotate until they reach the stripper-bars at the rear of the machine-body, when they will stop rotating until they again enter the said channel. There is, therefore, a stay in, or a cessation of, the rotating of the picking-spindles during approximately one-half of a revolution of the cylinder. This cessation of, or stay in, the rotating of the picking-spindles, I prefer to term "dwell" and in the several claims where I mention "dwell", I desire it understood that this term refers to the stopping, or cessation of the rotation, of the picking-spindles while revolving with the cylinder.

Having thus fully described my invention I claim as new and desire to secure to me by Letters Patent of the United States—

1. A cotton harvester, comprising, in combination, a machine-body; cotton-picking mechanism located therein and including a cylinder comprising two end-plates, a series of columns mounted in said end-plates and connecting the same, a series of picking-spindles rotatingly disposed in each column, the picking-spindles in one column being staggered with reference to the picking-spindles in the adjacent column, a number of said picking-spindles rotating in one direction and the others rotating in the opposite direction, during the entire time that the picking-spindles are rotating to pick lint from cotton plant portions, means for rotating the cylinder, and means for rotating the picking-spindles, the latter means including a shaft in each column, a series of bevel-wheels on said shaft, and a bevel pinion on each picking-spindle and located in said column, a number of said bevel-wheels facing and engaging their respective bevel-pinions in one direction, and the remainder of said bevel-wheels facing and engaging their respective bevel-pinions in the opposite direction, and means for rotating said shafts.

2. In a cotton harvester, the combination, with a machine-body, of cotton-picking mechanism located therein; traction-wheels for said machine-body; axles upon which said traction-wheels are mounted; a bell-crank upon each of said axles; means for pivotally connecting said bell-cranks with said machine-body; a hand-lever; a shaft to which said hand-lever is affixed; arms on said shaft, and rods connecting said arms with said bell-cranks.

3. In a cotton harvester, the combination, with a machine-body, of cotton-picking mechanism located therein; traction-wheels for said machine-body; axles upon which said traction-wheels are mounted; a bell-crank upon each of said axles; means for pivotally connecting said bell-cranks with said machine-body; springs connecting said machine-body with said bell-cranks; a hand-lever; a shaft to which said hand-lever is affixed; arms on said shaft, and rods connecting said arms with said bell-cranks.

4. In a cotton harvester, the combination, with a machine-body, of cotton-picking mechanism located therein, said cotton-picking mechanism including picking-spindles; a channel in said machine-body into which said picking-spindles enter and from which they are withdrawn to pick cotton from cotton plants admitted to said channel, said channel being of comparatively limited compass where the picking-spindles enter said channel and of gradually increased width where the said picking-spindles are withdrawn therefrom.

5. In a cotton harvester, the combination, with a machine-body, of cotton-picking mechanism located therein, said cotton-picking mechanism including picking-spindles; a channel in said machine-body into which said picking-spindles enter and from which they are withdrawn to pick cotton from cotton-plants admitted to said channel, said channel being of comparatively limited compass where the picking-spindles enter said channel and of gradually increased width where the said picking-spindles are withdrawn therefrom, there being in said channel a depressor in front of said picking mechanism.

6. In a cotton harvester, the combination, with a machine-body, of cotton-picking mechanism located therein, said cotton-picking mechanism including picking-spindles; a channel in said machine-body into which said picking-spindles enter and from which they are withdrawn to pick cotton from cotton plants admitted to said channel, said channel being of comparatively limited compass where the picking-spindles enter said channel and of gradually increased width where the said picking-spindles are withdrawn therefrom, there being in said channel a depressor in front of said picking mechanism, said depressor comprising a roller located transversely in said channel.

7. In a cotton harvester, the combination, with a machine-body, of cotton-picking mechanism located therein, said cotton-picking mechanism including picking-spindles; a channel in said machine-body into which said picking-spindles enter and from which they are withdrawn to pick cotton from cotton plants admitted to said channel, said channel being of comparatively limited compass where the picking-spindles enter said channel and of gradually increased width where the said picking-spindles are withdrawn therefrom, there being in said channel a depressor in front of said picking mechanism, said depressor comprising a roller located transversely in said channel, and adapted to be elevated and lowered.

8. In a cotton harvester, the combination, with a machine-body, of cotton-picking mechanism located therein, said cotton-picking mechanism including picking-spindles; a channel in said machine-body into which said picking-spindles enter and from which they are withdrawn to pick cotton from cotton plants admitted to said channel, said channel being of comparatively limited compass where the picking-spindles enter said channel and of gradually increased width where the said picking-spindles are withdrawn therefrom, there being in said channel a depressor in front of said picking mechanism, said depressor comprising a roller located transversely in said channel, and adapted to be elevated and lowered, said roller being journaled in bars having a series of bearings, said roller being adapted to be elevated and lowered by changing bearings.

9. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars.

10. In a cotton harvester, the combination, of a machine-body; cotton-picking mechanism located in said machine-body, and including rotating picking spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible.

11. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible, and securely fastened at their forward ends, to the forward part of the machine-body.

12. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible, and securely fastened to the forward part of the machine-body at their forward ends and free at their rear ends.

13. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible, and securely fastened to the forward part of the machine-body at their forward ends and free at their rear ends, said rear ends being upwardly bent.

14. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said grate underlying branches of said cotton plants; and a depressor in said channel, said depressor being located above said grate and approximately opposite the curved ends thereof.

15. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter; means for rotating the said cylinder; means for rotating the picking-spindles, and means whereby the picking-spindles in each of said columns when approaching the vertical center line of said cylinder are rearwardly inclined and after passing the said vertical center line are forwardly inclined so that the picking ends of the spindles in at least two adjacent columns are in close proximity to each other in their lowermost position when picking cotton from cotton plants which pass through said machine-body.

16. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking spindles in one column being staggered with reference to the picking spindles in the adjacent column; means for rotating the cylinder; means for rotating the picking spindles, and means whereby the picking spindles in each of said columns when approaching the vertical center line of said cylinder are rearwardly inclined, and after passing said vertical center line are forwardly inclined, so that the picking ends of said spindles in at least two adjacent columns are in close proximity to each other in their lowermost position when picking cotton from cotton plants which pass through said machine-body.

17. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being alternately staggered with reference to the picking-spindles in the adjacent column; means for rotating the cylinder; means for rotating the picking-spindles, and means whereby the picking-spindles in each of said columns when approaching the vertical center line of said cylinder are rearwardly inclined and after passing said vertical center line are forwardly inclined, so that the picking ends of the spindles in at least two adjacent columns are in close proximity to each other in their lowermost position when picking cotton from cotton plants which pass through said machine-body.

18. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter; the picking-spindles in one column being staggered with reference to the picking-spindles in the adjacent column; means for rotating the cylinder; means for rotating the picking-spindles, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which pass through said machine-body.

19. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being alternately staggered with reference to the picking-spindles in the adjacent column; means for rotating the cylinder; means for rotating the picking-spindles, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined so that the picking ends of the spindles in at least two adjacent columns are in close proximity to each other in their lowermost position when picking cotton from cotton plants which pass through said machine-body.

20. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being alternately staggered with reference to the picking-spindles in the adjacent column; means for rotating said cylinder; means for imparting an intermittent rotative movement to said picking-spindles, and means whereby the picking-spindles in each of said columns when approaching the vertical center line of said cylinder are rearwardly inclined, and after passing said vertical center line are forwardly inclined, so that the picking ends of said spindles in at least two adjacent columns are in close proximity to each other in their lowermost position when picking cotton from cotton plants which said machine-body passes.

21. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being staggered with reference to the picking-spindles in the adjacent column; means for rotating the cylinder; means for imparting an intermittent rotative movement to said picking-spindles, and means whereby the picking-spindles in each of said columns when approaching the vertical center line of said cylinder are rearwardly inclined, and after passing said vertical center line are forwardly inclined, so that the picking-spindles in at least two adjacent columns are in close proximity to each other in their lowermost position when picking cotton from cotton plants which the machine-body passes.

22. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking spindles disposed in each column and rotating with the cylinder about the axis of the latter, means for rotating said cylinder;

means for intermittently rotating said picking-spindles, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes.

23. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being staggered with reference to the picking-spindles in the adjacent column; means for rotating the cylinder; means for intermittently rotating the picking-spindles, a number of said picking-spindles rotating in one direction, and the others rotating in the opposite direction, and means whereby the picking-spindles in each of said columns when approaching the vertical center line of said cylinder are rearwardly inclined and after passing said vertical center line are forwardly inclined, so that the picking ends of the spindles in at least two adjacent columns are in close proximity to each other in their lowermost position when picking cotton from cotton plants which said machine-body passes.

24. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being alternately staggered with reference to the picking-spindles in the adjacent column; means for rotating the cylinder; means for rotating the picking-spindles intermittently, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes.

25. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter; means for rotating said cylinder; means for rotating said picking-spindles, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes, said means for imparting the latter movement to said picking-spindles including a cam-plate, an endless tortuous groove in said cam-plate, and means on said columns adapted to engage said tortuous groove.

26. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking spindles disposed in each column and rotating with the cylinder about the axis of the latter, the picking-spindles in one column being staggered with reference to the picking-spindles in the adjacent column; means for rotating said cylinder; means for rotating said picking-spindles, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes, said means for imparting the latter movement to said picking-spindles including a cam-plate, an endless tortuous groove in said cam-plate, and means on said columns adapted to engage said tortuous groove.

27. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being alternately staggered with reference to the picking-spindles in the adjacent column; means for rotating said cylinder; means for rotating said picking-spindles, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes, said means for imparting the latter movement to said picking-spindles including a cam-plate, an endless tortuous groove in said cam-plate, and means on said columns adapted to engage said tortuous groove.

28. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes, said means for imparting the latter movement to said picking-spindles including a cam-plate, an endless tortuous groove in said cam-plate, and means on said columns adapted to engage said tortuous groove.

29. A cotton harvester, comprising, in combination, a machine-body; cotton-picking mechanism located therein, and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being staggered with reference to the picking-spindles in the adjacent column; means for rotating the cylinder; means for rotating the picking-spindles, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes, said means for imparting the latter movement to said picking-spindles including a cam-plate, an endless tortuous groove in said cam-plate, and means on said columns adapted to engage said tortuous groove.

30. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being alternately staggered with reference to the picking-spindles in the adjacent column; means for rotating the cylinder; means for rotating the picking-spindles, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes, said means for imparting the latter movement to said picking-spindles including a cam-plate, an endless tortuous groove in said cam-plate, and means on said columns adapted to engage said tortuous groove.

31. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being staggered with reference to the picking-spindles in the adjacent column; means for rotating the cylinder; means for imparting an intermittent rotative movement to said picking-spindles and means whereby the picking-spindles in each of said columns when approaching the vertical center line of said cylinder are rearwardly inclined, and after passing said vertical center line are forwardly inclined, so that the picking ends of said picking-spindles in at least two adjacent columns are in close proximity to each other when in their lowermost position and picking cotton from cotton plants which said machine-body passes, said means for imparting the latter movement to said picking-spindles including a cam-plate, an endless tortuous groove in said cam-plate, and means on said columns adapted to engage said tortuous groove.

32. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being alternately staggered with reference to the picking-spindles in the adjacent column; means for rotating said cylinder, means for imparting an intermittent rotative movement to said picking-spindles, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes, said means for imparting the latter movement to said picking-spindles including a cam-plate, an endless tortuous groove in said cam-plate, and means on said columns adapted to engage said groove.

33. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter; means for rotating the cylinder; means for imparting an intermittent rotative movement to said picking-spindles, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined, so that the picking-ends of the spindles in at least two adjacent columns are in close proximity to each other in their lowermost position when picking cotton from cotton plants which said machine-body passes, said means for imparting the latter movement to said picking-spindles including a cam-plate, an endless tortuous groove in said cam-plate, and means on said columns adapted to engage said tortuous groove.

34. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being staggered with reference to the picking-spindles in the adjacent column; means for rotating the cylinder; means for imparting an intermittent rotative movement to said picking-spindles, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes, the means for imparting the latter movement to said picking-spindles including a cam-plate, an endless tortuous groove in said cam-plate, and means on said columns adapted to engage said tortuous groove.

35. A cotton harvester, comprising, in combination, a machine-body; cotton-picking mechanism located therein and including a cylinder rotating about a horizontal axis and comprising two end-plates, a series of columns mounted in said end-plates and connecting the same, a series of picking-spindles disposed in each column and rotating with the cylinder about the axis of the latter, the picking-spindles in one column being alternately staggered with reference to the picking-spindles in the adjacent column; means for rotating the cylinder; means for imparting an intermittent rotative movement to said picking-spindles, a number of said picking-spindles rotating in one direction and the others rotating in the opposite direction, and means whereby the picking-spindles in each of said columns when approaching the vertical center line of said cylinder are rearwardly inclined, and after passing said vertical center line are forwardly inclined, so that the picking ends of the spindles in at least two adjacent columns are in close proximity to each other in their lowermost position when picking cotton from cotton plants which said machine-body passes, said means for imparting the latter movement to said picking-spindles including a cam-plate, an endless tortuous groove in said cam-plate, and means on said columns adapted to engage said tortuous groove.

36. A cotton harvester, comprising, in combination, a machine-body; a channel in said machine-body adapted to receive cotton plant portions while cotton is being picked therefrom; cotton-picking mechanism located in said machine-body in fixed position relative thereto; a stub-axle on each longitudinal side of said machine-body; traction-wheels upon said stub-axles; intermediate mechanism adapted to receive said stub-axles and to connect the same with said machine-body; means whereby said intermediate mechanism is oscillated to bodily raise and lower said machine-body and its contained picking-mechanism, and means operated by said traction-wheels adapted to actuate said picking-mechanism.

37. A cotton harvester, comprising, in combination, a machine-body; a channel in said machine-body adapted to receive cotton plant portions while cotton is being picked therefrom; cotton-picking mechanism located in said machine-body in fixed position relative thereto; a stub-axle on each longitudinal side of said machine-body; traction-wheels upon said stub-axles; intermediate mechanism adapted to receive said stub-axles and to connect the same with said machine-body; means whereby said intermediate mechanism is oscillated to bodily raise and lower said machine-body and its contained picking-mechanism, and means operated by said traction-wheels adapted to actuate said picking-mechanism, said intermediate mechanism including a pair of arms carrying said axles on one of their extremities, the other extremities being pivotally connected with said machine-body.

38. A cotton harvester, comprising, in combination, a machine-body; cotton-picking mechanism located therein; traction-wheels for said machine-body; stub-axles upon which said traction-wheels are mounted; intermediate mechanism connecting said machine-body with said axles; means connected with said intermediate mechanism adapted to rock the same to raise and lower said machine-body; means for approximately relieving the rocking-means from the weight of the machine-body including tension-springs connected at one end to said machine-body and at the other end with the intermediate mechanism, and means operated by the traction-wheels adapted to actuate said picking-mechanism.

39. In a cotton harvester, the combination, with a machine-body, of cotton-picking mechanism located therein; traction-wheels for said machine-body; axles upon which said traction-wheels are mounted; intermediate mechanism connecting said machine-body with said axles; means connected with said intermediate mechanism adapted to rock said intermediate mechanism to raise and lower said machine-body; means for approximately relieving the rocking-means from the weight of the machine-body including tension-springs, and means operated by said traction-wheels for operating said cotton-picking mechanism, and means adapted to actuate said intermediate mechanism including bell-cranks journaled in said machine-body, one member of said bell-cranks carrying one of said axles and the other member being connected to one of said tension-springs.

40. In a cotton harvester, the combination, with a machine-body, of cotton-picking mechanism located therein; traction-wheels for said machine-body; axles upon which said traction-wheels are mounted; intermediate mechanism connecting said machine-body with said axles; means connected with said intermediate mechanism adapted to rock the same to raise and lower said machine-body; means for approximately relieving the rocking mechanism from the weight of the machine-body including tension-springs; means operated by said traction-wheels adapted to actuate said picking-mechanism, said intermediate mechanism including bell-cranks journaled in said machine-body, one member of each bell-crank carrying one of said axles and the other member being connected to one of said tension-springs, said means for rocking said intermediate mechanism including a hand-lever, a shaft to which said hand-lever is affixed, arms on the ends of said shaft, bearings for said shaft, and rods connecting said arms with said bell-cranks.

41. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible, said grate underlying branches of said cotton plants, and a depressor in said channel, said depressor being located above said grate and approximately opposite the curved ends thereof.

42. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible and securely fastened at their forward ends below the forward portion of the machine-body and free at their rear ends, said grate underlying branches of said cotton plants; and a depressor in said channel, said depressor being located above said grate and approximately opposite the curved ends thereof.

43. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible and securely fastened at their forward ends below the forward portion of the machine-body and free at their rear ends, said rear ends being upwardly bent, said grate underlying branches of said cotton plants, and a depressor in said channel, said depressor being located above said grate and approximately opposite the curved ends thereof.

44. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible, said grate underlying branches of said cotton plants, and a depressor in said channel, said depressor being located above said grate and approximately opposite the curved ends thereof, said depressor comprising a roller adapted to be elevated and lowered by changing bearings.

45. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible, said grate underlying branches of said cotton plants, and a depressor in said channel, said depressor being located above said grate and approximately opposite the curved ends thereof, said depressor comprising a roller located transversely in said channel and adapted to be elevated and lowered.

46. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible, said grate underlying branches of said cotton plants, and a depressor in said channel, said depressor being located above said grate and approximately opposite the curved ends thereof, said depressor comprising a roller located transversely in said channel and adapted to be elevated and lowered, said roller being journaled in bars having a series of bearings.

47. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible, said grate underlying branches of said cotton plants, and a depressor in said channel, said depressor being located above said grate and approximately opposite the curved ends thereof, said depressor comprising a roller located transversely in said channel and adapted to be elevated and lowered, said roller being journaled in bars having a series of bearings, said roller being adapted to be elevated and lowered by changing bearings.

48. In a cotton-harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible and securely fastened at their forward ends below the forward portions of the machine-body, said grate underlying branches of said cotton plants, and a depressor in said channel, said depressor being located above said grate and approximately opposite the curved ends thereof, said depressor comprising a roller located transversely in said channel and adapted to be elevated and lowered, said roller being journaled in bars having a series of bearings, said roller being adapted to be elevated and lowered by changing bearings.

49. In a cotton harvester, the combination, of a machine-body; cotton-picking mechanism located in said machine-body, and including rotating picking-spindles; a channel in said machine-body into which said picking-spindles enter, and from which they are withdrawn to pick cotton from plants admitted to said channel, there being in said channel and in front of said picking mechanism a grate, said grate consisting of a series of approximately horizontal bars, said bars being flexible and securely fastened at their forward ends below the forward portion of the machine-body and free at their rear ends, said rear ends being upwardly bent, said grate underlying branches of said cotton plants, and a depressor in said channel, said depressor being located above said grate and approximately opposite the curved ends thereof, said depressor comprising a roller located transversely in said channel and adapted to be elevated and lowered, said roller being journaled in bars having a series of bearings, said roller being adapted to be elevated and lowered by changing bearings.

50. In a cotton harvester, the combination, of a machine-body; cotton-picking mechanism located in said machine-body; a channel in said machine-body in which the picking mechanism operates to remove cotton from cotton plants admitted to said channel, and scrapers, said scrapers being located in front of the picking mechanism and comprising a pair of blades moving in close proximity to the ground over which the machine is being moved, said scrapers being inwardly and rearwardly inclined, a frame-structure to which said scrapers are adjustably secured including sockets; rods in said sockets; further sockets at the upper ends of said rods; a yoke of which said sockets form a part, said yoke being pivoted and adapted to freely oscillate upon its pivot so that the scrapers are adapted to follow the undulations of the ground over which the machine is being moved.

51. In a cotton harvester, the combination, of a machine-body; cotton picking mechanism located in said machine-body; a channel in said machine-body in which the picking mechanism operates to remove cotton from cotton plants admitted to said channel, and scrapers, said scrapers being located in front of the picking mechanism and comprising a pair of blades moving in close proximity to the ground over which the machine is being moved, said scrapers being inwardly and rearwardly inclined, a frame-structure to which said scrapers are adjustably secured including sockets; rods in said sockets; further sockets at the upper ends of said rods; a pole, and means for pivotally securing said yoke to said pole.

52. In a cotton harvester, the combination, of a machine-body; cotton-picking mechanism located in said machine-body; a channel in said machine-body in which the picking mechanism operates to remove cotton from cotton plants admitted to said channel, and scrapers, said scrapers being located in front of the picking mechanism and comprising a pair of flexible blades moving in close proximity to the ground over which the machine is being moved, said scrapers being inwardly and rearwardly inclined, a frame-structure to which said scrapers are adjustably secured including sockets; rods in said sockets; further sockets at the upper ends of said rods; a yoke of which said sockets form a part; a pole, and means for pivotally securing said yoke to said pole.

53. In a cotton harvester, the combination, of a machine-body; cotton picking mechanism located in said machine-body; a channel in said machine-body in which the picking-mechanism operates to remove cotton from cotton plants admitted to said channel, and scrapers, said scrapers being located in front of picking mechanism and comprising a pair of flexible blades moving in close proximity to the ground over which the machine is being moved, said scrapers being inwardly and rearwardly inclined, a frame-structure to which said scrapers are adjustably secured including sockets; rods in said sockets; further sockets at the upper ends of said rods; a yoke of which said sockets form a part, said yoke being pivoted and adapted to freely oscillate upon its pivot so that the scrapers are adapted to follow the undulations of the ground over which the machine is being moved.

54. In a cotton harvester, the combination, with a machine-body including rotating picking-spindles, of cotton picking-mechanism located in said machine-body, and means for lubricating the picking mechanism, said means including a tank, a regulating faucet; a distributing tube in said machine-body; a hose connecting said faucet with said distributing tube, there being a series of apertures in said distributing tube, and means in said apertures adapted to check the flow of lubricant and direct it into the plane in which the spindles revolve.

55. In a cotton harvester, the combination, with a machine-body including rotating picking-spindles, of cotton-picking mechanism located in said machine-body, and means for lubricating the picking mechanism, said means including a tank, a regulating faucet; a distributing tube in said machine-body; a hose connecting said faucet with said distributing tube, there being a series of apertures in said distributing tube, and means in said apertures adapted to check the flow of lubricant through and from said apertures and direct it into the plane in which the spindles revolve.

56. In a cotton harvester, the combination, with a machine-body including rotating picking-spindles, of cotton-picking mechanism located in said machine-body, and means for lubricating the picking mechanism, said means including a tank, a regulating faucet; a distributing tube in said machine-body; a hose connecting said faucet with said distributing tube, there being a series of apertures in said distributing tube, and means in said apertures adapted to check the flow of lubricant through and from said apertures and direct it into the plane in which the spindles revolve, said means comprising cotter-pins.

57. In a cotton harvester, the combination, with a machine-body including rotating picking-spindles, of cotton-picking mechanism located in said machine-body, and means for lubricating the picking mechanism, said means including an elevated tank, a regulating faucet; a distributing tube in said machine-body; a hose connecting said faucet with said distributing tube, there being a series of apertures in said distributing tube, and means in said apertures adapted to check the flow of lubricant through and from said apertures and direct it into the plane in which the spindles revolve, said means comprising wires, said wires being bent at their lower ends.

In testimony that I claim the foregoing as my invention I have hereunto set my hand in the presence of two subscribing witnesses.

ORLEY C. HOUGHTON.

Attest:
MICHAEL J. STARK,
A. G. PETERSON.